United States Patent [19]

Osanai

[11] 4,441,131
[45] Apr. 3, 1984

[54] MAGNETIC HEAD

[75] Inventor: Akira Osanai, Hachioji, Japan

[73] Assignee: Olympus Optical Co., Ltd., Tokyo, Japan

[21] Appl. No.: 277,122

[22] Filed: Jun. 25, 1981

Related U.S. Application Data

[63] Continuation of Ser. No. 13,267, Feb. 21, 1979.

[30] Foreign Application Priority Data

Mar. 8, 1978 [JP] Japan .................................. 53/26201

[51] Int. Cl.³ .......................... G11B 5/25; G11B 5/22; G11B 5/12
[52] U.S. Cl. .................................... 360/119; 360/122; 360/125
[58] Field of Search .............. 360/119, 122, 125, 126, 360/127

[56] References Cited

U.S. PATENT DOCUMENTS 3,908,194  9/1975  Romankiw .......................... 360/113

OTHER PUBLICATIONS

Frost et al., "Fabrication . . . Head", IBM Tech Disc Bull., vol. 7, No. 11, Apr. 1965, p. 993.

Primary Examiner—Robert S. Tupper
Attorney, Agent, or Firm—Weinstein & Sutton

[57] ABSTRACT

A magnetic head for vertical magnetization recording comprises a pair of magnetically coupled limbs one of which has a reduced reluctance, the other limb comprises a laminated structure comprising a magnetizable material of a greatly reduced thickness held between nonmagnetic materials. The exposed end face of the magnetizable material is disposed for abutment against a magnetic record medium to serve as a record/playback pole.

1 Claim, 5 Drawing Figures

MAGNETIC HEAD

This is a continuation of application Ser. No. 013,267, filed Feb. 21, 1979.

BACKGROUND OF THE INVENTION

The invention relates to a magnetic head, and more particularly, to a magnetic head for use in a tape recorder, video tape recorder (VTR) etc., in which a high density recording is achieved by establishing a remanence in the direction of thickness of a magnetic record medium such as a magnetic tape.

Ordinarily, the technique to record an information signal on a magnetic record medium such as magnetic tape generally comprises bringing a magnetic head into contact with the surface of the medium to establish a remanence in a direction parallel to the surface of the medium. According to this technique, the head has its poles located opposite to each other with a narrow air gap therebetween so that a leakage flux from the gap is bypassed through the medium. Because the leakage flux passes through the medium in a direction parallel to its surface, the magnetizable material contained in the medium is magnetized in a direction parallel to the surface of the medium, with its remanence defining a magnetic recording. With the described magnetic recording technique, it is known that considerations of the air gap of the magnetic head and the frequency of the signals being recorded impose a limitation on the recording density of the information signal.

Recently, a variety of recording techniques have been proposed which drastically improve the recording density by a so-called vertical magnetization scheme in which a remanence is established in the medium in a direction perpendicular to the surface thereof or in the direction of its thickness. This technique employs a magnetic record medium having an easy axis of magnetization in a direction perpendicular to the surface. Referring to FIG. 1, there is shown a magnetic record medium 6 comprising a base film 6c of polyester, for example, carrying an upper layer 6b of high permeability material and a top layer 6a coated thereon which is formed of a magnetizable material having an easy axis of magnetization in a direction perpendicular to the surface.

FIG. 1 also shows a magnetic head 1 which may be used for recording a signal in such medium. Specifically, the head 1 comprises a magnetic head core 2 of a magnetizable material such as ferrite which has an inverted U-configuration, and a coil 3 disposed thereon. The core 2 includes one limb 4 which has its free end tapered, with its end face defining a narrow rectangle which is elongate in a direction perpendicular to the direction of movement of the record medium and forming a pole 4a for recording and/or playback. This end face is adapted to be disposed in abutment against the medium. The core has its other limb 5 which has an increased thickness to present an increased cross-sectional area, thus reducing its reluctance.

In operation, when a signal current is passed through the coil 3 as the medium 6 moves to the left, as viewed in FIG. 1, relative to the head 1, flux 7 is produced within the core 2 as indicated by dotted line. The flux passes from the pole 4a vertically through the layer 6a and passes through the layer 6b in a direction perpendicular to the surface and returns to the limb 5, thus forming a closed magnetic path. It will be seen that as the flux passes vertically through the portion of the layer 6a which is located opposite to the pole 4a, a remanence is produced therein in a direction perpendicular to the surface, and because the pole 4a has a reduced width, a high flux density is produced. In a region of the layer 6a which is located opposite to the limb 5, the flux density is greatly reduced because of an increased area of the end face of the limb 5, and hence no substantial or effective magnetization occurs in this region of the layer 6a. As the medium 6 continues to move to the left relative to the head 1, a pattern of the remanence corresponding to the signal current is recorded in the top layer 6a, thus achieving a magnetic recording.

During the playback operation, the both limbs 4 and 5 have their end faces disposed in abutment against the medium 6, and latter driven to the left. The remanance recorded in the medium passes through a closed magnetic path including core 2, top layer 6a and the high permeability layer 6b, linking with the coil 3 to produce a playback current which varies in accordance with a variation in the remanence recorded in the top layer 6a of the medium with time.

In order to increase the recording density and the magnitude of remanence produced in the medium 6, it is desirable that the width 1 of the pole 4a be made as narrow as possible. In one instance, a width on the order of 0.1 micron may be required. However, it is very difficult to form a very narrow width of the pole 4a because of the mechanical properties of a magnetizable material such as ferrite, and if it is possible to achieve a precise machining, the pole 4a having such a reduced width is soon abraded or cracked, preventing its practical use.

FIG. 2 shows another form of conventional magnetic head 11. This head comprises a magnetic head core 12 having an inverted L-configuration, a record/playback pole 14 which is magnetically coupled with the free end of the horizontal arm of the core to present a generally inverted U-configuration therewith, and a coil 13 disposed on the core. The pole 14 is formed of a thick non-magnetic material 16 and a layer 17 of a magnetizable material having a greatly reduced thickness and which is formed as by sputtering, with the free end face of the layer 17 defining a record/playback pole face 17a. Vertical arm of the core 12 has an increased thickness to present an increased cross-sectional area to form the other pole 15 having a reduced reluctance. The formation of the layer 17 as by sputtering facilitates its manufacturing, and enables the thickness of the layer 17 to be reduced as desired. However, because the layer 17 remains exposed externally, it is susceptible to damage. Also there remains the disadvantage that the edge or corner of the free end of the layer 17 is apt to be cracked.

SUMMARY OF THE INVENTION

It is an object of the invention to provide a magnetic head for vertical magnetization recording scheme having a magnetic record/playback pole face which is defined by the end face of a layer of magnetizable material which is interposed between a pair of non-magnetic materials.

In accordance with the invention, a magnetic record/playback pole having a pole face of a desired, greatly reduced width can be easily obtained. Because the layer having the end face which defines the pole face is held between and secured to non-magnetic blocks, any abrasion or cracking of the pole face can be prevented in a positive manner, thus removing the disadvantages of conventional magnetic heads.

DESCRIPTION OF THE PREFERRED EMBODIMENTS

Figure 1:
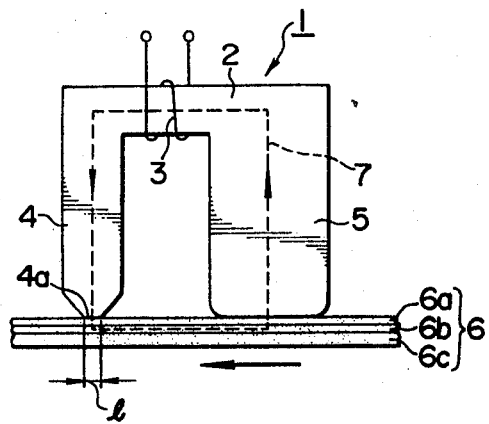
FIGS. 1 and 2 are side elevations of conventional magnetic heads.
Figure 2:
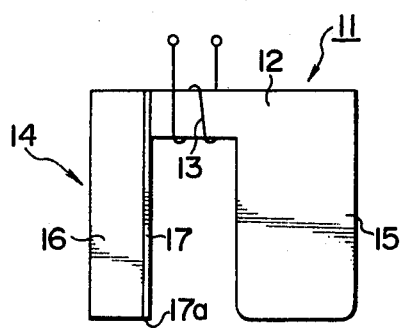
Figure 3:
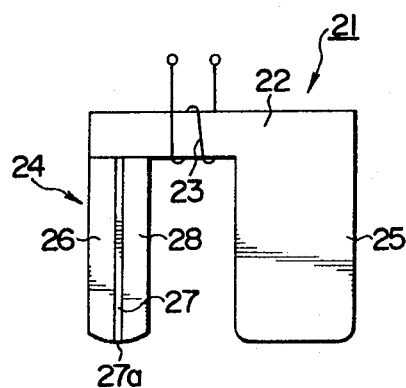
FIG. 3 is a side elevation of the magnetic head according to one embodiment of the invention.

Referring to FIG. 3, there is shown a magnetic head according to one embodiment of the invention. A magnetic head 21 comprises a magnetic head core 22 having an inverted L-configuration which may be formed of ferrite or the like, a limb member 24 magnetically coupled with and secured to the end of the horizontal arm of the core so that the entire assembly has an inverted U-configuration, and a coil 23 disposed on the core 22. The limb 24 comprises a slab 26 of non-magnetic material, a layer 27 of magnetizable material which is sputtered on one surface of the slab 26, and another slab 28 of non-magnetic material secured to the layer 27, thus forming a multi-layer composite structure. The free end face of the limb 24 is polished to a round form, thus exposing the end face of the layer 27, which defines a pole face 27a for abutment against the medium 6 (see FIG. 1). As before, the vertical arm of core 22 has an increased thickness to present an increased cross-sectional area, thus providing a limb 25 having a reduced reluctance.

The operation of the magnetic head 21 is similar to that of conventional heads 1 and 11 mentioned above. Namely, when a signal current is passed through the coil 23, a recording flux is produced within the core 22 which follows a closed magnetic path extending through the medium 6 as mentioned above in connection with FIG. 1. Flux emanating perpendicular from the pole face 27a passes through the medium to produce a remanence which is directed perpendicular to the surface thereof, thus recording the signal. During the playback operation, the remanence recorded in the medium follows a closed path including the core 22, inducing a playback current in a coil 23 as the medium moves relative to the core 22.

Figure 4:
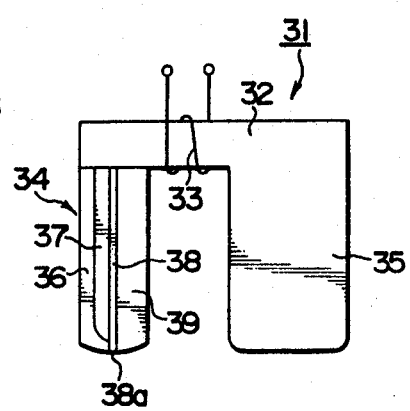
FIG. 4 is a side elevation of another embodiment of the invention.

FIG. 4 shows another embodiment of the invention. This magnetic head 31 is an improvement of the previous embodiment in that the saturation of the magnetic path in the limb 24 is avoided. Specifically, in the previous embodiment, the magnetic path in the limb 24 is formed by only the layer 27 which is sputtered and hence is very thin. This may cause a saturation of the recording flux to prevent the latter from reaching the pole face 27a, or to prevent a closed magnetic path passing through the coil 23 from being satisfactorily formed during the playback operation. The head 31 includes a magnetic head core 32 having an inverted L-configuration which is formed of ferrite or the like, a magnetic limb 34 magnetically coupled and secured to the end of the horizontal arm of the core so as to generally present an inverted U-configuration therewith, and a coil 33 disposed on the core. The limb 34 comprises a plate-shaped member 37 of magnetizable material, a slab 36 of non-magnetic material covering one surface and the free end of the member 37, a layer 38 of magnetizable material which is sputtered onto the other surface of the member 37 and to a portion of the inner surface of the slab 36 adjacent to the free end thereof, both of these surfaces being polished to be flush with each other, and another slab 39 of non-magnetic material which is secured to the layer 38, thus forming a four-layer composite structure. The end face of the limb 34 is polished to a rounded form, thus exposing the end face of the layer 38 which defines a pole face 38a for abutment against the magnetic record medium. As before, the vertical arm of the core 32 has an increased width to present an increased cross-sectional area, thus providing a limb 35 having reduced reluctance.

With the magnetic head 31, the magnetic path within the limb 34 is formed by both member 37 and layer 38 to a point which is close to the pole face 38a, thus preventing a saturation thereof.

Figure 5:
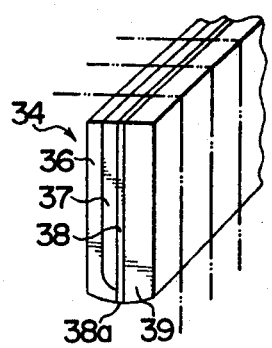
FIG. 5 is a perspective view illustrating one process step of manufacturing the head shown in FIG. 4.

FIG. 5 shows one process step of manufacturing the limb 34. As shown, a composite structure comprising parts 36, 37, 38 and 39 which are laminated crosswise with each other is provided, and is cut to size as indicated by phantom lines, thus providing a plurality of limbs 34.

In the embodiment described above, the layers 27, 38 have been formed by sputtering, but it should be understood that any other technique such as evaporation may be used provided a thin layer of magnetizable material can be formed.

What is claimed is:

1. A magnetic head for use in record/playback of a magnetic tape having a longitudinal axis extending along the length of the tape, said tape including a first magnetizable layer having high permeability and a second magnetizable layer which includes an axis of magnetization perpendicular to said longitudinal axis and which is attached to said first magnetizable layer, said magnetic head comprising a first member and a second member magnetically coupled, said first member having a low reluctance and a first free end facing close to said magnetic tape, said second member having a second free end formed as a record/playback pole, said second member being a laminated structure including two outer layers of non-magnetic material and first and second internal layers having a high permeability disposed between said two outer layers and cooperating to prevent saturation of the recording flux, said first internal layer being covered by one of said two outer layers, said second internal layer being a thin layer narrower than said first layer and formed on one surface of one of said two outer layers by sputtering or evaporation, said second internal layer extending to said second free end of said second member to form said record/playback pole, said first internal layer being shorter than said second internal layer, with the free end of said first outer layer being formed on the free end of said first internal layer.

* * * * *